(12) United States Patent
Park

(10) Patent No.: US 8,066,861 B1
(45) Date of Patent: Nov. 29, 2011

(54) METHOD FOR PREPARING METAL POWDER, DEVICE FOR PREPARING METAL POWDER, METHOD FOR PROCESSING SPENT NUCLEAR FUEL

(75) Inventor: Jong-Hee Park, Clarendon Hills, IL (US)

(73) Assignee: The United States of America as represented by the Department of Energy, Washington, DC (US)

( * ) Notice: Subject to any disclaimer, the term of this patent is extended or adjusted under 35 U.S.C. 154(b) by 722 days.

(21) Appl. No.: 12/031,146

(22) Filed: Feb. 14, 2008

(51) Int. Cl.
*C25C 5/04* (2006.01)

(52) U.S. Cl. .............. 205/43; 205/44; 205/46; 205/370; 205/371; 205/397; 75/344; 75/368; 75/369; 75/397; 75/399; 75/613; 75/614; 95/45; 95/54

(58) Field of Classification Search .............. 75/368, 75/369, 397, 399, 613, 344, 396; 205/43–47, 205/354, 370, 371, 397; 95/45, 54
See application file for complete search history.

(56) References Cited

U.S. PATENT DOCUMENTS

| | | | |
|---|---|---|---|
| 2,427,339 A * | 9/1947 | Alexander | 423/645 |
| 2,813,019 A | 11/1957 | Olson et al. | |
| 2,817,630 A * | 12/1957 | Dean | 205/397 |
| 2,845,386 A * | 7/1958 | Olson | 205/371 |
| 4,399,108 A | 8/1983 | Krikorian et al. | |
| 4,519,837 A * | 5/1985 | Down | 75/707 |
| 4,551,303 A | 11/1985 | Moriguchi et al. | |
| 4,740,359 A | 4/1988 | Hadi Ali et al. | |
| 4,923,577 A | 5/1990 | McLaughlin et al. | |
| 5,118,343 A * | 6/1992 | Coops | 75/396 |
| 5,356,605 A * | 10/1994 | Tomczuk et al. | 423/251 |
| 6,544,404 B1 * | 4/2003 | Mazanec et al. | 205/765 |
| 7,390,392 B1 * | 6/2008 | Choi et al. | 205/781.5 |

OTHER PUBLICATIONS

U.S. Appl. No. 11/374,849, filed Mar. 14, 2006, Park et al.
Experimental Physical Chemistry, 7th Ed., p. 53, McGraw-Hill Book Co., New York (1970).
The Laboratory Handbook of Chemistry and Physics, 71st Edition (CRC Press, 1990-91), pp. 117-123.

* cited by examiner

*Primary Examiner* — Roy King
*Assistant Examiner* — Ngoclan Mai
(74) *Attorney, Agent, or Firm* — Joy Alwan; Brian J. Lally; John T. Lucas (57) ABSTRACT

A method for producing metal powder is provided the comprising supplying a molten bath containing a reducing agent, contacting a metal oxide with the molten bath for a time and at a temperature sufficient to reduce the metal in the metal oxide to elemental metal and produce free oxygen; and isolating the elemental metal from the molten bath.

8 Claims, 6 Drawing Sheets

METHOD FOR PREPARING METAL POWDER, DEVICE FOR PREPARING METAL POWDER, METHOD FOR PROCESSING SPENT NUCLEAR FUEL

CONTRACTUAL ORIGIN OF THE INVENTION

The U.S. Government has rights in this invention pursuant to Contract No. W-31-109-ENG-38 between the U.S. Department of Energy and the University of Chicago representing Argonne National Laboratory.

BACKGROUND OF THE INVENTION

1. Field of the Invention

This invention relates to a method for recovering metal from metal oxide, and more specifically, this invention relates to a method for producing metal powder from metal oxide without the production of waste, nor the need to recondition reaction liquor.

2. Background of the Invention

The recent renewed interest in nuclear power stems from higher petroleum costs and also petroleum's role in carbon dioxide emissions. According to the Intergovernmental Panel on Climate Change (IPCC), total carbon emissions from the energy sector are expected to grow from today's 6.5 billion tons to 13 billion tons in 2050, with total cumulative emissions of carbon through 2050 of 440 billion tons.

The management of a nuclear system of a scope to even begin ameliorizing this anticipated carbon load requires planning. For example, a worldwide capacity of 3500 GWe (a figure of illustrative convenience, ten times current capacity), if based on a once-through fuel cycle using light water reactors, would generate roughly 700 tons of plutonium annually, and would require on the order of one-half million tons of natural uranium annually. If based on liquid-metal plutonium breeder reactors, it would involve the fabrication into fresh fuel annually of over five thousand tons of plutonium. Such a quantity of plutonium exacerbates the potential of its diversion for military and paramilitary purposes.

Also, efforts are ongoing to extend the life of currently operating nuclear reactors and introduce successive generations of more advanced reactors to the U.S. energy infrastructure. As the number of deployed nuclear reactors increase, the demands of a once-through fuel cycle paradigm on long-term repositories also increase.

Ninety percent of the waste proposed for disposal at the geologic repositories generally consists of spent nuclear fuel, such as that generated by commercial nuclear power plants, government reactors, and naval-propulsion-plant reactors. A large portion of spent nuclear fuel consists of certain metal oxides, such as plutonium oxide, uranium oxide, and zirconium oxide. The volume of these oxides must be minimized.

U.S. Pat. No. 4,399,108, awarded to Krikorian et al. on Aug. 16, 1983, discloses a catalyst/molten metal combination for reprocessing spent nuclear fuels.

U.S. Pat. No. 4,740,359 awarded to Haid Ali et al. On Apr. 26, 1988, discloses an organic/aqueous extraction method for reprocessing nuclear fuels.

U.S. Pat. No. 2,813,019, awarded to Olson on Nov. 12, 1957, discloses a method for producing zirconium metal via the reduction of zirconium halides using reducing metals.

U.S. Pat. No. 4,923,577, awarded to McLaughlin et al. on May 8, 1990, discloses a method for reducing zirconium chloride via treatment in a bath containing alkali metal chlorides and alkaline metal chlorides.

None of the aforementioned prior art teaches a method for reducing metal oxides found in spent nuclear fuel which features in situ rejuvenation of reducing agent. Further, none of the aforementioned prior art teaches a continuous reducing process of metal oxides, whereby the only limiting reagent is the feedstock metal oxide.

A need exists in the art for a method for recovering metals from spent nuclear fuel. The method should eliminate the need for recharging of reduction baths. The method should also allow for the continuous processing of metal oxides such that the only significant limiting reagent is the metal oxide.

SUMMARY OF THE INVENTION

An object of the present invention is to provide a method for producing metal powders that overcomes many of the disadvantages of the prior art.

Another object of the present invention is to provide a method for producing metal from metal oxides generated in nuclear reactor processes. A feature of the method is the reduction of metal cation to elemental metal when the metal oxides contact a molten fluid containing a reducing agent. An advantage of the invented method is an in situ regeneration of the molten fluid during redox processes, therefore eliminating need for the bath to be repurified, reprocessed or reclaimed.

Yet another object of the present invention is to provide a method for producing metal powders. A feature of the invention is using a reducing agent having a lower melting point than the target metals. An advantage of the invention is that isolation of the target metals from the reducing agent reaction liquor involves simple two phase separation whereby solid phase elemental metal separates from liquid phase liquor constituents via gravity.

In brief, this invention provides a method for producing metal powder, the method comprising: supplying a molten bath containing a reducing agent; contacting a metal oxide with the molten bath for a time and at a temperature sufficient to reduce the metal in the metal oxide to elemental metal and produce free oxygen, mostly in the form of oxygen ions; and isolating the elemental metal from the molten bath.

The invention also provides a device for transporting ions, the device comprising:
a metallic film having a first surface and a second surface; an oxygen ion permeable ceramic contacting the second surface of the film; an electrically-conductive material contacting both the second surface and the oxygen-ion permeable ceramic; and a cathode in electrical communication with the electrically conductive material and an anode in electrical communication with the first surface of the metallic film.

Also provided is a method for producing zirconium powder, the method comprising supplying molten fluid containing a reducing agent in an inert atmosphere; contacting zirconium oxide with the molten fluid for a time and at a temperature sufficient to reduce the zirconium to elemental metal; and removing the elemental metal from the molten fluid.

BRIEF DESCRIPTION OF THE DRAWING

The foregoing and other objects, aspects and advantages of this invention will be better understood from the following detailed description of the preferred embodiments of the invention with reference to the drawing, in which.

DETAILED DESCRIPTION OF THE INVENTION

The invention provides a method for processing spent nuclear fuel and more particularly, this invention relates to the recovery of metals from metal oxide found in nuclear fuel. Such oxides include, but are not limited to, zirconium oxide, uranium oxide, plutonium oxide, titanium oxide, hafnium oxide, molybdenum oxide, vanadium oxide, chromium oxide, iron oxide, cobalt oxide, nickel oxide, and combinations thereof.

In one embodiment of the invention, a method is presented for preparing metal powder from its associated oxide without the formation of waste product. A salient feature of the invention is the manipulation of reaction temperature to produce specific metal particle sizes.

The chemistry of the transformation is presented infra as Equation 1, with zirconium oxide used solely for illustrative purposes. It should be appreciated that inasmuch as the reaction takes place in an inert atmosphere, an oxygen ion gradient is established such that oxygen ions are removed from the reducing agent bath (in this instance molten lithium). The maintenance of an inert environment and prompt removal of any oxygen formed provides a means for molten lithium maintaining its status as a reducing agent and also to maintain the lithium's purity simultaneous with the redox reaction occurring.

$$ZrO_2 + Li \longrightarrow Zr(\text{element}) + Li + O^{-2} \quad \text{Equation 1}$$

The method comprises adding zirconium oxide to molten lithium wherein the lithium is maintained above its melting point of 180.6° C. Temperatures of from the melting point of the reductant to the melting point of the reaction container constituents are suitable. Preferably, reaction temperatures are selected from 200° C. and 800° C., and most preferably reaction temperatures range from 350-650° C. As noted supra, the lower the temperature, the finer the grain size of the resulting metal powder produced. The inventors have found that when reaction temperatures are maintained at 650 C, very fine powder grains (i.e., about 18 to 30 mesh size or smaller) are produced.

The oxygen released from the zirconium oxide during the reduction reaction passes through the molten lithium and into an inert atmosphere. Inert atmospheres include those comprising argon, helium, negative pressure, substantially complete vacuum, and combinations thereof. Alternatively, any atmosphere which does not react with the primary molten bath constituent (in this embodiment, lithium), or the to-be-treated metal oxide is inert.

Another embodiment of the present method utilizes electrochemical oxygen pumping to remove the oxygen gas from the reduction chamber. In this embodiment, a membrane comprised of thermodynamically stable oxygen ion permeable material (such as thoria ($ThO_2$), thoria-coated yttria stabilized zirconia, and combinations thereof) directly contacts the surface of the molten lithium so as to hermetically seal the reduction chamber from the environment.

A voltage potential is applied across the membrane such that the environmentally exposed surface of the thoria membrane acts as a cathode to draw oxygen ions from the lithium melt, through the membrane and out into the environment. Upon passing through the membrane, the oxygen ions become uncharged oxygen atoms, with their electrons shuttled to the anode. The atoms combine to form oxygen gas, or else react with oxygen-active elements, moieties or compounds to form an oxygen-containing compound.

The primary reaction at the cathode side (i.e., the side of the membrane facing the lithium melt) is as follows:

$$2O + 4e \rightarrow 2O^{-2} \quad \text{Equation 2}$$

whereas the primary reaction at the anode side (i.e., the side of the membrane facing away from the lithium melt) is as follows:

$$2O^{-2} \rightarrow O_2 + 4e \quad \text{Equation 3}$$

In one embodiment of the invention, the membrane hermetically seals the melt from the head space 22. Preferably, any sealing of the membrane to the medially facing surfaces of the housing should be done at room temperature to ensure effective seals to substantially all edges defining the periphery of the membrane.

Given the exothermic nature of the reduction reaction, after an initial influx of heat (of approximately 200 C) to begin the reaction, no additional input of heat or other energy is needed to sustain the reaction. As such, with a continual feed of metal oxide to the reaction chamber, the reaction is self perpetuating. Surprisingly and unexpectedly, the inventors found that trace amounts of calcium added to the lithium bath improves the reduction-oxidation mechanism while simultaneously lowering the melting point of the lithium. Suitable trace amounts of calcium to the lithium are from 0.1 to 13 atomic percent. A eutectic mixture of lithium to calcium is established at a calcium concentration of 7.7 atomic percent (32.5 weight percent calcium). That eutectic temperature is 141° C. The inventor is using "eutectic mixture" here in its standard meaning, which is to say a constituent mixture in such proportions that its melting point is as low as possible. Aside from calcium, elements such as magnesium and strontium also can be added to the melt, depending on the type of powder desired.

The invention for reducing zirconium oxide to zirconium metal is applicable for the reprocessing of spent nuclear reactor oxide fuels, such as uranium oxide and plutonium oxide so as to reduce the metal oxides to the metals for further reprocessing. Aside from zirconium, uranium and plutonium, other metals such as titanium, chromium, iron, hafnium, cobalt, iron, nickel, vanadium and molybdenum can be isolated via the invented process. In an embodiment of the invention, titanium is utilized in lithium melt to remove nitrogen from the melt in the form of titanium nitride. This embodiment also provides a means for producing titanium nitride powder. Generally, those metals which do not dissolve in lithium, and which exhibit higher electronegativities than the reducing agent contained in the reaction slurry, are suitable candidates for isolation.

In an embodiment of the invention, elemental metal formed from the process is isolated from the molten bath by gravitation. For example, in the case of the separation of zirconium metal (density of 10-20 grams/cubic centimeter) from liquid phase lithium (density of 0.5 g/cc), the zirconium metal will settle to the bottom of a fraction collector positioned inferior to the reaction chamber. Any solid residual lithium interspersed between the solid metal particles is removed via application of a vacuum. Solvent extraction processes which utilize alcohols or even water are suitable means for separating metal from residual lithium. One such process is disclosed in *The Laboratory Handbook of Chemistry and Physics*, 71st Edition (CRC Press, 1990-91), and incorporated herein by reference.

Apparatus Detail

Figure 1:
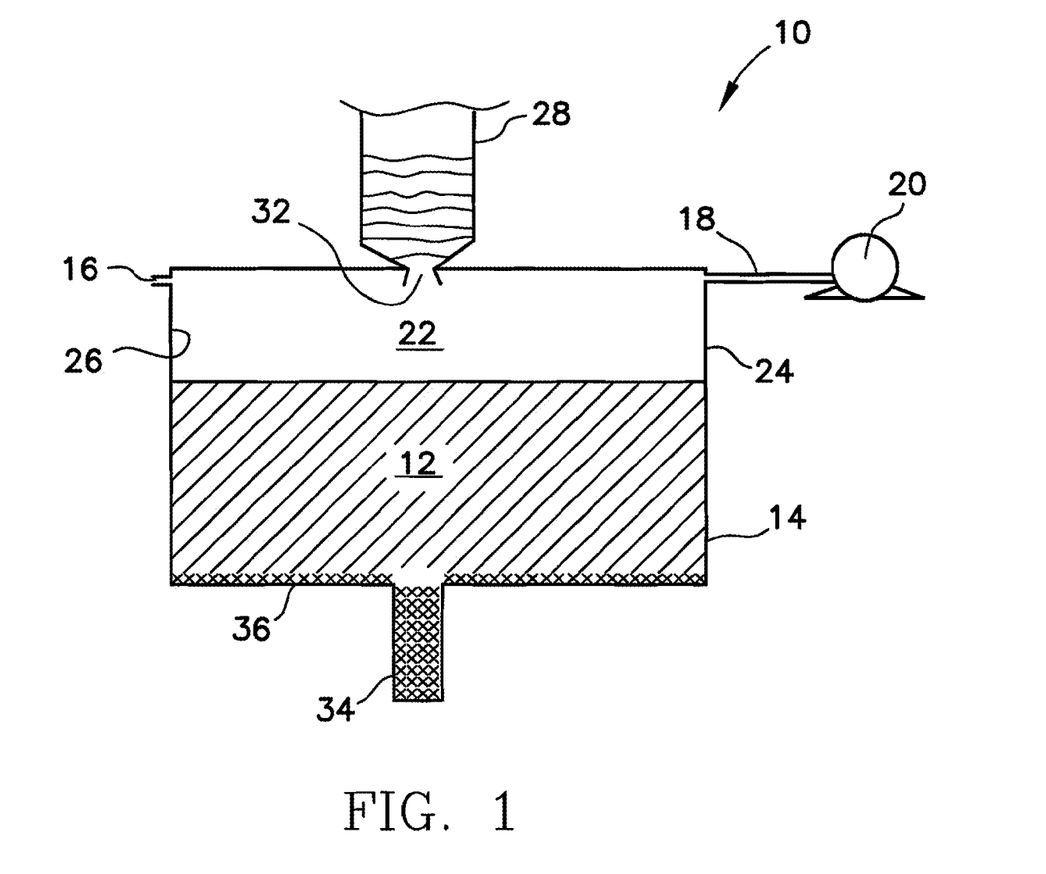
FIG. 1 is an elevational view of a device utilized to practice the invention, in accordance with features of the present invention.

FIG. 1 depicts an embodiment 10 of a device used to practice the invented method. In this first embodiment, a liquid phase (such as a molten bath) 12 of a reducing agent is confined within a housing 14. Regions of the housing 14 define a means of ingress 16 and egress 18 of fluid, the regions positioned above the surface of the liquid phase 12. In fluid communication with the egress means 18 is a vacuum pump 20 or other means for evacuating a head space 22, which is defined by the surface 24 of the bath and the inside surfaces 26 of the housing 14.

In operation, an inert atmosphere is established within the head space 22. Then, reducing fluid, such as lithium is melted so as to establish a molten mass 12 beneath the head space. Preferably, the inert atmosphere is established before the molten bath is established. Also, for optimal conditions, substantially all moisture is evacuated from the atmosphere prior to the establishment of the lithium bath.

Once the atmosphere establishes equilibrium with the molten bath, metal oxide is introduced into the housing, by for example, a hopper 28 situated above the housing so as to gravity-feed metal oxides or other material residing in the hopper into the housing. These solid materials are subjected to decladding and pulverization prior to, or concomitant with, their placement into the hopper 28. A solid material means of ingress 32 is positioned intermediate the hopper and the housing. The hopper and solid means of ingress 32 are configured so as to assure processing of the solids and fluids residing within the housing while maintaining the atmosphere at a certain temperature, and conditions, the temperature and conditions empirically determined based on the purity requirements of the solid metal produced.

Situated in close spatial relationship to the housing 14 is a fraction collector 34 adapted to receive relatively dense metal particles 36 formed in the molten reaction fluid as a result of the exothermic redox reaction. In one embodiment, the fraction collector 34 is situated inferior to the housing so as to facilitate the collection of the denser metal fractions via gravity.

Figure 2:
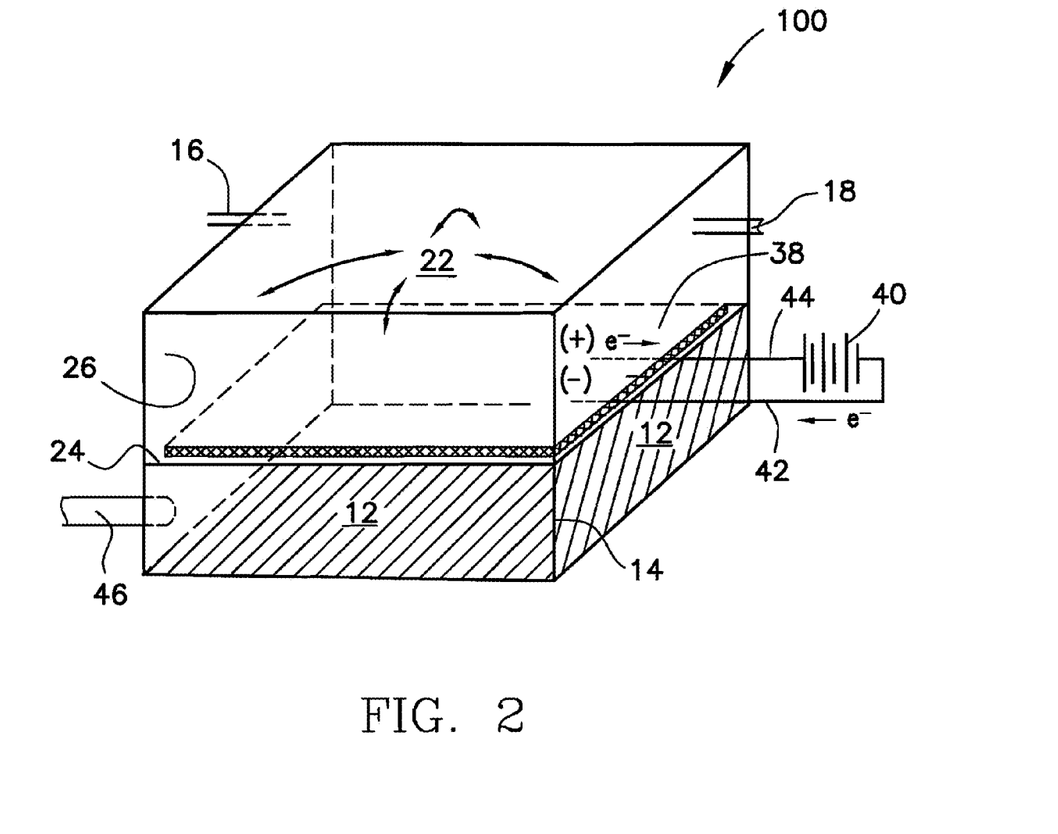
FIG. 2 is a perspective view of an alternative embodiment of a device utilized to practice the invention, utilizing an electrochemical oxygen pump/membrane configuration, in accordance with features of the present invention.

A second embodiment of the invented process is schematically depicted in FIG. 2 as numeral 100. A salient feature of this embodiment is an oxygen permeable substrate 38 contacting a surface 24 of the molten bath 12 so as to substantially cover the surface 24. The substrate is positioned to be floating on top of the surface. Alternatively the substrate 38 is removably attached to the sides 26 of the housing 14 to substantially cover or otherwise isolate the surface of the melt (in the form of a barrier) from direct fluid contact with the gas residing in the head space 22. A seal between the periphery of the substrate 38 and the interior walls of the housing 14 is effected by any suitable means, including the use of a soft sealing substrate, or rubber gasket. These gaskets are widely available through several suppliers. For example, gaskets made by fluoroelastomers and performance polytetrafluoroethylenes exist and are sold by well known producers such as Dupont under the Viton®, Kalrez® and/or Teflon® trade names.

A conduit 26 for introducing the metal oxide into the lithium melt bath is situated so as to provide fluid communication from the outside of the container to the interior of the bath 12. In one embodiment, the conduit 26 forms a transverse passage through a vertical wall of the housing 14.

A voltage from an electricity source 40 is applied to the substrate 38 (such as a membrane comprising thoria) so as to facilitate an ion gradient from the molten bath 12 to the head space 22. In the case where oxygen ions are to be evacuated from the molten bath (pursuant to the chemistry depicted in Equation 1), the voltage is applied so as to attract anions (i.e., oxygen ion) through the membrane. In one embodiment, a cathode 42 emanating from the electricity source 40 is placed in electrical communication with a surface of the membrane that faces the head space 22, while concomitantly, an anode 44 from the electricity source is in electrical communication with the surface of the membrane in contact with the molten bath. This causes negatively charged ions to be pulled from the molten bath, through the membrane, and either evacuated from the head space via a vacuum system 20, combined with an identical ion to form a gas, or combined with cation located within the head space 22.

Preferably, this second embodiment of the invention is utilized when the head space is maintained at an inert atmosphere, for example without the initial presence of oxygen in the head space at start-up of the redox process. This absence of oxygen optimizes reduction of the target metal, while minimizing complexation of lithium with another elements in the closed environment established within the housing.

Figure 3:
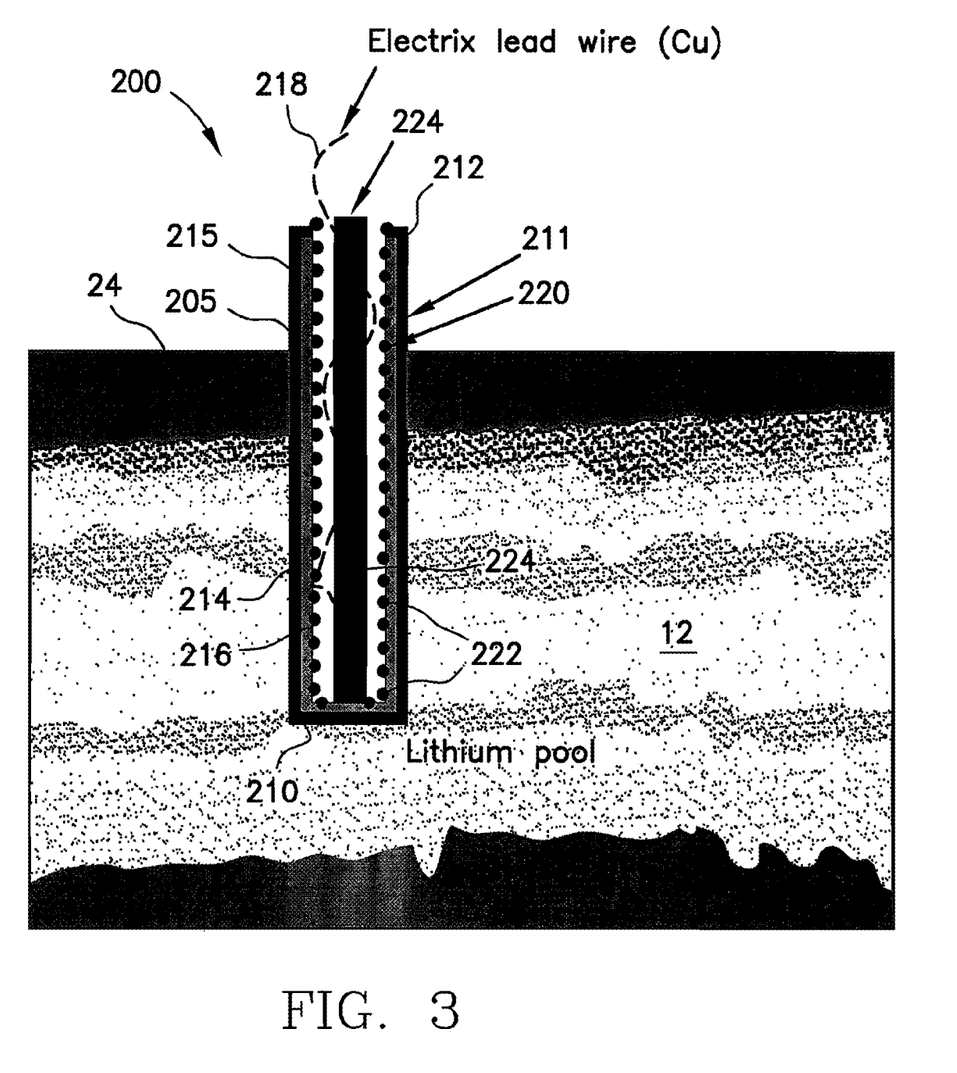
FIG. 3 is an elevational view of a membrane/ceramic construct to facilitate electrochemical pumping of oxygen, in accordance with features of the present invention.

FIG. 3 depicts an ion transporter 200 for facilitating electrochemical pumping of anions from molten reduction baths 12. A salient feature of the process utilizing this transporter is at least partial immersion of the device 200 into molten reduction baths (see FIG. 4) such that substantially all regions of exterior surfaces of the immersed portion of the device are contacting the bath. One embodiment of the device 200 defines an elongated substrate 205 having a first end 210, adapted to be fully immersed below a surface of a molten reduction bath, and a second end 212 adapted to protrude above the surface of the molten bath. In this embodiment, the second end is positioned, sealed, or otherwise configured so as to regulate fluid communication with the atmosphere 22 or head space. For example, a periphery or lip of the tube defining the opening at the second end 212 is sealed to the periphery of an aperture defined by a region of the housing such that the elongated substrate 205 defines a hermetically sealed conduit to facilitate fluid communication from the molten pool to a collector (not shown) situated outside of the device.

An outer surface 214 of the construct comprises a thermodynamically-stable material 211 such as thorium metallic film. Such a film can have a myriad of thicknesses, so long as the thickness is effective at providing thermal resistance to structures the film is coating or overlaying. Generally having a thickness of between 50-100 microns are suitable. Any material which is oxygen ion permeable, and which can withstand temperatures up to 1000° C. is suitable. Usually, the range in which the film is required to exhibit thermal integrity is from 600 to 1000° C.

In one embodiment of the device 200, an inwardly (i.e., medially) directed surface 216 of the thermodynamically stable material is in direct contact with an inert atmosphere which imparts a negative pressure upon the inwardly directed surface. Also in contact with the medially directed surface 216 is a cathode from an electrical source. Conversely, a region 215 of the outer (i.e., laterally facing) surface 214 of the construct is in electrical communication with a cathode of an electrical source. Preferably, this region 215 is not in contact with the molten bath so as to be above the surface of the molten bath 12.

In another embodiment of the device 200, the inwardly directed surface 216 of the thermodynamically stable material is in contact with a substrate which has greater anion permeability than the thermodynamically stable material. Suitable substrates include, but are not limited to yttria stabilized zirconia (YSZ), calcia stabilized zirconia, yttria doped ceria, and combinations thereof. The anion-permeable material facilitates transport of anions from the exterior surface of the device (i.e., the surface in electrical contact with the cathode) to an interior of the device which is in electrical contract with the anode 218. The use of such materials as YSZ is a means to maintain an oxygen-ion gradient across the thoria membrane, while minimizing the deposition of secondary oxides onto the inwardly directed surface 216 of the membrane. An electrically conductive material 224, such as graphite powder or other physically free-flowing conductor, may be applied onto the substrate 220 so as to maintain the electrical connection between the inwardly directed surface 216 of the thermodynamically stable material and the anode 218 of an electricity source. Alternatively, or in combination with the free flowing electrically conductive material, copper webbing 222 extends over substantial portions of a medially facing surface 221 of the anion-conducting substrate 220 so as to provide an interior bus or harvesting source for the electrons collecting on the medially-facing surface 221. An electrical conductor such as a wire, the free flowing conductive material 224 or other means for establishing electrical communication, is contacted with the webbing 222 so as to facilitate electron transfer from the webbing to the anode 218. In this embodiment, the copper basically functions as means for establishing electrical contact with the anode.

At this juncture, the device 200 resembles a hollow tube with three layers, an outer thermodynamically stable layer, an intermediate layer 220 of highly oxygen ion permeable material, and an inner layer of electrically conducting material, such as the copper webbing 222, whereby the webbing is dispersed such that regions of the intermediate layer remain in direct fluid communication with an inside cavity defined by the tube. Therefore, the electrically conducting material does not cover the entire medially facing surface of the intermediate layer.

In another embodiment, the webbing 222 completely overlays the intermediate layer 220 so as to serve as a physical barrier between the void defined by the inside cavity of the tube and the intermediate layer. This complete overlayment provides a means for shielding or protecting the intermediately layer from impact, such as which may occur when loading the void space with free flowing conducting material 224.

A protocol for making the oxygen pump conduit, depicted as element number 200 in FIG. 3 includes the following:
1. Selecting a yttria stabilized zirconia tube such that the thickness of the walls of the tube are selected to optimize oxygen exchange through the walls of the tube. In one embodiment, the inventors have determined that given an inner diameter of 0.5 to 1 inch, the wall thickness can range from 2 to 3 millimeters. The tube is closed at one end and open at the other.
2. Contacting substantially all surfaces (i.e., interior facing and exterior facing) of the tube to a mixture of thorium chloride and yttrium chloride. Weight percents of the yttrium could range from 6-12 percent, and preferably 8-10 percent. Weight percents of the thorium can range from 85-95 weight percent and preferably 90-92 percent. $ThCl_4$ has a melting point of 820° C. while $YCl_3$ melts at 721° C. Therefore, a suitable temperature for the bath containing the two chlorides is above 820° C. This contacting step can be effectuated via dip coating, chemical vapor deposition, or some other deposition means.
3. Maintaining the chloride covered YSZ tube in an atmosphere of yttrium acetate hydrate (YAH), boron, and lithium, wherein the atmosphere is maintained at between 50 and 90° C., and preferably 60 and 70° C. Concentration of the boron in the atmosphere is 2800 parts per million (ppm), and of the lithium is 0.7 ppm. As a slurry, the concentration of YAH in the atmosphere is at least 40 weight percent, preferably above 50 weight percent.
4. After immersion in the atmosphere for between 5 and 24 hours, the construct was dried under vacuum at the reaction temperature of 25° C. for approximately 3 to 60 minutes.

The void defined by the tube can be filled with a free flowing material 224 such as graphite, activated carbon, hydrogen gas, or some other gaseous, liquid, or solid electrical conductor. In the case of hydrogen gas, its presence facilitates the production of water when oxygen anions emerge from the anion-conducting substrate 220. Use of high surface area material such as activated carbon additionally serves as a reaction surface. Generally, by conforming to the interior topography of the device, the free flowing material optimizes electrical contact between the anion-permeable substrate 220 and the anode. Also, the above-mentioned free-flowing material facilitates the establishment of low oxygen partial pressures. As such, a lower operating electric potential (lower compared to if air was filling the void space) can be utilized to operate the device.

Figure 4:
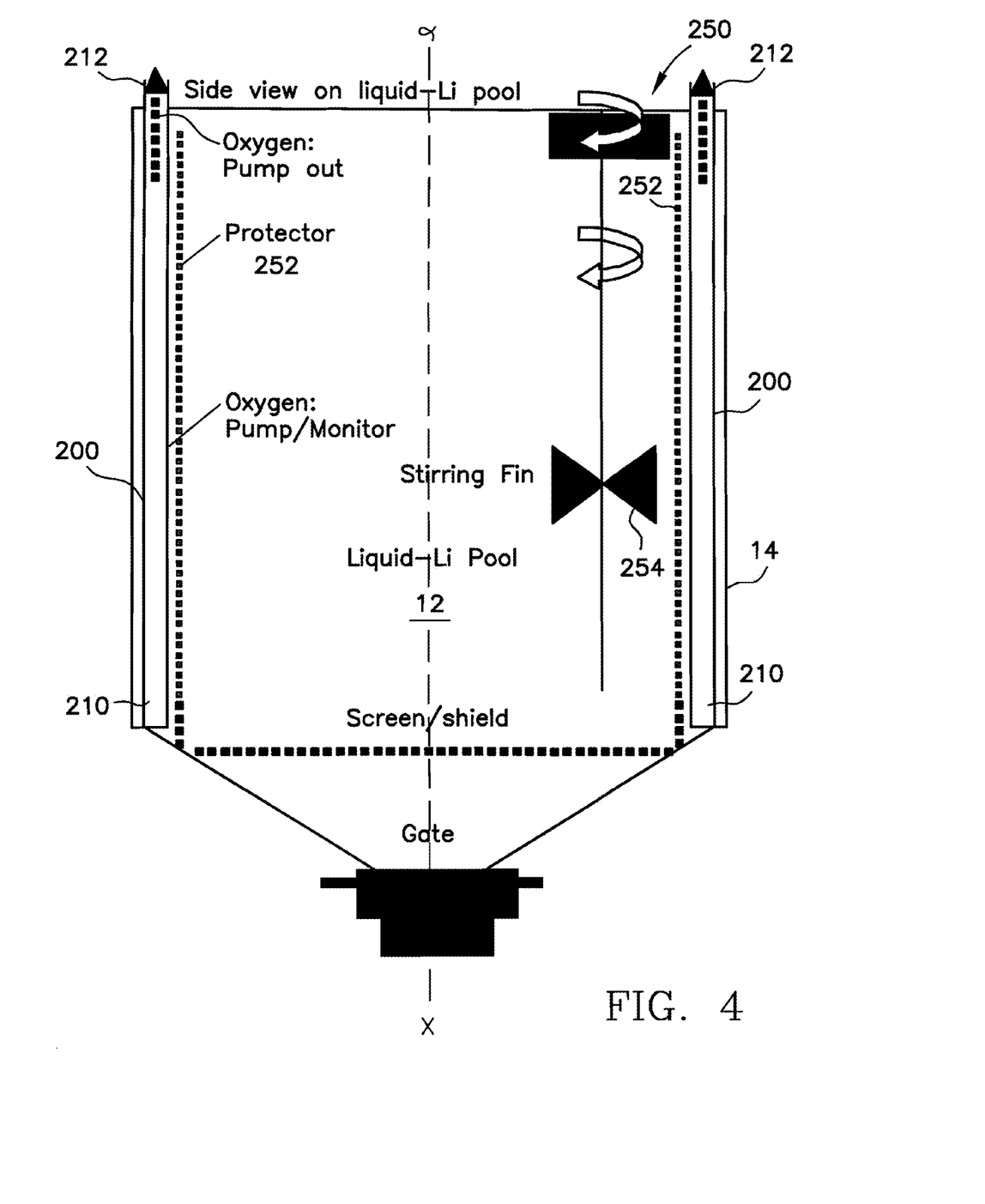
FIG. 4 is an elevational view of a device containing a plurality of ion transporters to facilitate reduction of metal oxides, in accordance with features of the present invention.

FIG. 4 shows a plurality of composite ion transporters 200 situated within a device, designated as numeral 250, for facilitating reduction of metal oxides. As depicted in FIG. 4, the transporters 200 are substantially completely immersed within a molten bath 12 except for the upwardly directed ends 212, these ends necessary to establish electrical contact with a power supply such as that supply 40 detailed in FIG. 2. In the embodiment shown, the transporters are positioned so as to be parallel with the longitudinal axis a of the device 250. The transporters 200 can be cylindrical, ellipsoid, planar, square or polygonal in cross section. Planar (i.e. sheet-like) configurations allow the transporter(s) to extend along one or more of the inside surfaces of the walls of the housing 14.

Positioned intermediate the transporters 200 and the molten bath 12 is a thermally stable (up to 850° C.) webbing 252. Suitable constituents of the webbing is any metallic electrically conducting substrate which does not corrode during operation of the device. As such, suitable substrates include, but are not limited to, stainless steel, platinum, iron-chromium alloys, copper and combinations thereof. In one embodiment of the invention, these substrates are formed as grates, screens, or sheets with perforations therethrough.

The webbing 252 provides a means for protecting the outer surfaces of the transporters from accidental contact during loading and unloading of the device. Contained within the housing is a means for agitating 254 the molten bath so as to facilitate homogeneous dispersion of metal materials from a hopper (such as the hopper 28 shown in FIG. 1) throughout the molten bath 12.

Spent Fuel
Process Detail

Figure 5:
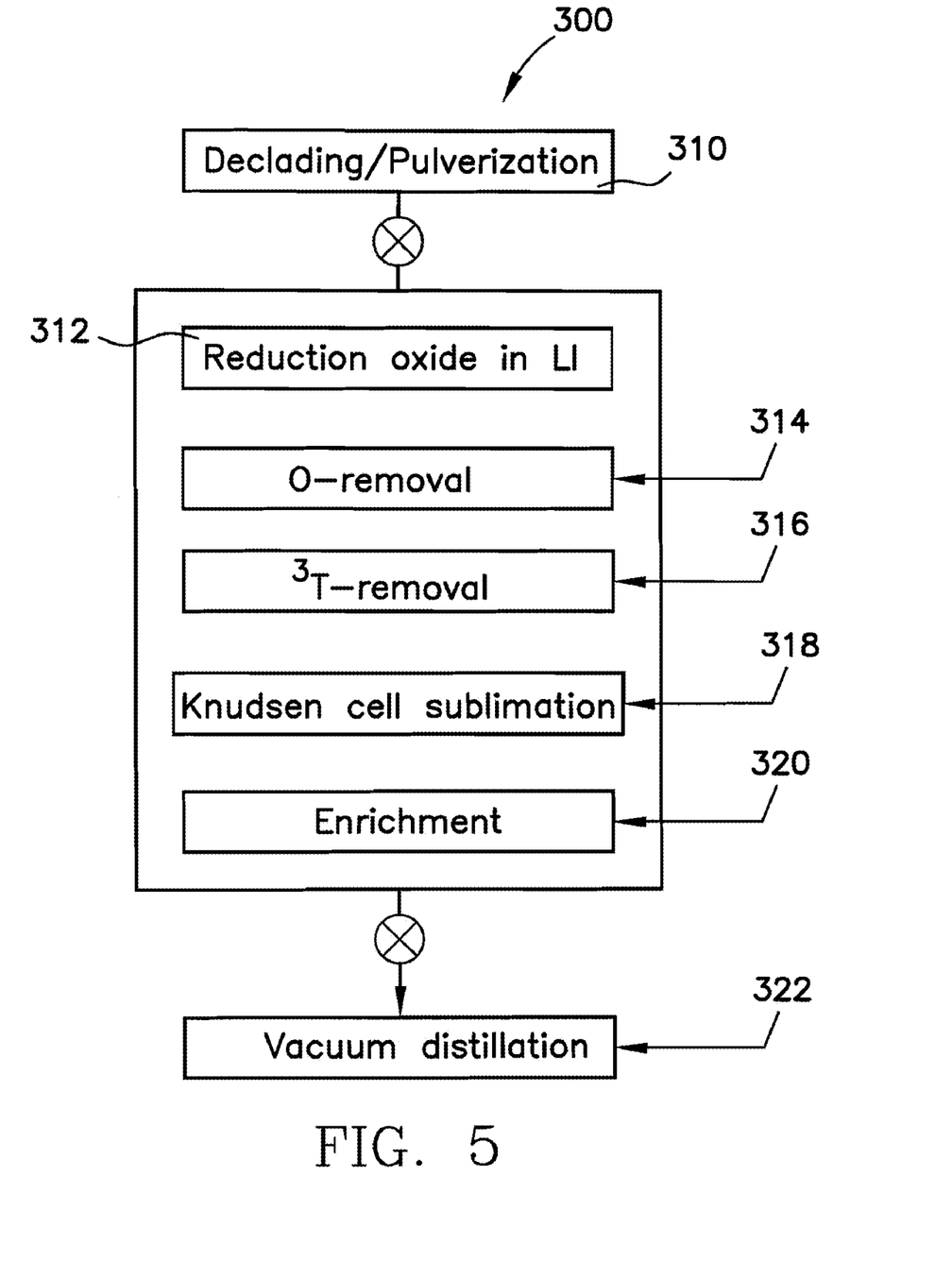
FIG. 5 is a schematic diagram of a decladding, reduction, tritium removal and sublimation process.

The invented process can be utilized as part of a suite of processes, all occurring within a single chamber, for treating spent nuclear fuel, the suite depicted in FIG. 5 as numeral 300.

Decladding/pulverization and sizing 310 of oxides, such as uranium oxide, plutonium oxide, oxides of americium, oxides of neptunium, oxides of curium, and combinations thereof, which is present in spent nuclear fuel, is a first step, and reminiscent of the sorting which occurs within the hopper 28 depicted in FIG. 1. Then, embodiments of the invented process, as depicted in FIGS. 1-3, supra, are employed to first reduce 312 the oxide, and then remove 314 the liberated oxygen via either a negative pressure applied to an inert atmosphere, as depicted in FIG. 1, or oxygen pumping facilitated by an oxygen permeable membrane 38 as depicted in FIG. 2.

Tritium/Hydrogen Removal

Concomitant with the oxide reduction process, and as depicted as element 316 in FIG. 5 is the removal of tritium via Equation 4, below:

$$^3H + Y \rightarrow Y^3H_2 (\equiv YT_2) \qquad \text{Equation 4}$$

Any tritium present in the molten lithium, and as first supplied by a load of spent nuclear fuel, can be removed via the invented method as follows:

First, a supply of molten lithium is maintained in an inert atmosphere. A suitable atmosphere comprises mainly argon gas.

Second, a bar, or plurality of elongated substrates of yttrium, each having a first end and a second end, is/are partially submerged in the molten lithium. The substrate(s) are submerged such that a depending end of the bar is enveloped by the lithium, while the second end (i.e., an upwardly extending end) of the bar(s) remain above the surface of the molten lithium pool so as to be enveloped by the inert atmosphere. The submerged end serves as the reagent source of yttrium in Equation 4. The upwardly extending end serves as a means for inserting and harvesting the bar(s) to and from the lithium melt.

Third, once the yttrium substrates are submerged, the entire system is heated for a time sufficient to effect the reaction depicted in Equation 4. A suitable reaction time and temperature is 2-6 four hours at between 500 and 900° C. An exemplary reaction time and temperature is 4 hours at 860° C. Upon passing of the reaction time, the entire system was cooled to above the melting point of lithium, and the bar was harvested from the pool. A suitable cooled atmosphere temperature is 200° C.

X-ray diffraction analysis of the heretofore submerged portion of the yttrium substrates shows that all except the core of the substrate exhibits cubic crystalline phase, which indicative of the presence of $YT_2$. A small core portion of the yttrium substrate, (approximately less than 10 percent) remained as native hexagonal closed packed structure, which is indicative of unreacted yttrium. For example, some empirical studies revealed that as little as 6 to 6.5 percent remained unreactive.

The unsubmerged portion (i.e., the portion of the bar not exposed to the molten lithium) of the yttrium substrate depicted identical hexagonal closed packed structure.

It is noteworthy that aside from tritium, the above process is also applicable for the collection of hydrogen residing in the lithium melt.

The tritium and/or hydrogen is harvested from the bar through thermal decomposition. In one harvesting embodiment, the bar is contacted with electric current. Inasmuch as the yttrium and yttrium hydride is electrically conductive, the target compound undergoes temperature increase. The electric potential is established under vacuum so as to gather the yttrium as it clones off or outgasses from the bar surface.

Cesium and Cadmium Removal Detail

Also included in the single chamber process 300 is the removal 318 of cesium and cadmium. An embodiment of the process utilizes Knudsen cell sublimation as a means for removing the cesium and cadmium. When metallic vapor, containing such fission products as cesium, cadmium, other volatile products generally, or combinations of these is being evacuated any relatively cooler (i.e. below the boiling point of the target metal) surface serves as the collection point.

When target moieties are entrained in a volatile fluid stream (such moieties as the volatile rare earth elements (Cs-137, Sr-90, etc.) often found in spent nuclear fuel streams a cold finger (so chilled using liquid nitrogen, dry ice or water) is utilized.

An exemplary teaching of a Knudsen cell design is found in U.S. Pat. No. 4,551,303, and incorporated herein by reference. Another teaching of a suitable Knudsen cell design is found in Experimental Physical Chemistry, $7^{th}$ Ed., p 53, McGraw-Hill Book Co. New York (1970), also incorporated herein by reference.

Finally, an enrichment step 320 is utilized. An embodiment of the invention teaches the enrichment step comprising a fractionator 34 wherein denser fractions of the reaction products, namely the target elemental metal, settle as the lowermost layers. These denser fractions are then extracted and may be further purified via vacuum distillation 322 or other means.

Intermetallic Compound Formation Detail

Another embodiment of the invention is to prepare intermetallic compounds of zirconium by adding to the molten lithium a small quantity of metal that is soluble in molten lithium, such as Al, Be, Si, Pt, and Cr. The addition of a small amount of metal (generally 0.1 to 5 weight percent of the slurry) results in the formation of an intermetallic compound. For example, the addition of aluminum, at approximately 0.1 weight percent to the molten lithium) would result in the formation of zirconium aluminide. The instant vehicle provides specifics for the formulation of various intermetallic compounds, the recipes for which are disclosed in U.S. patent application Ser. No. 11/374,849 filed on Mar. 14, 2006 and incorporated herein by reference.

Figure 6:
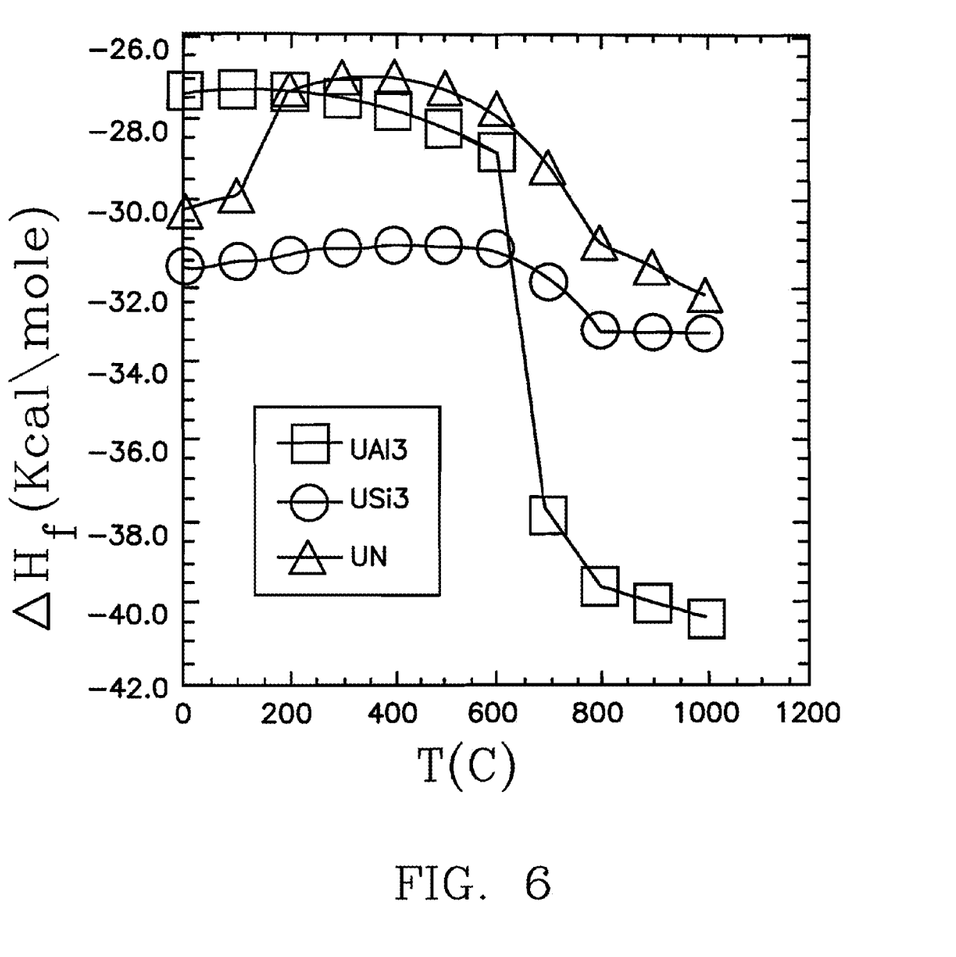
FIG. 6 is an enthalpy of formation diagram for intermetallics formed via the invented process, in accordance with features of the present invention.

FIG. 6 depicts heat of reaction for exemplary uranium-containing intermetallics formed via the invented method. All reactions are exothermic (negative formation enthalpies) at between 0 and 1200° C., with the aluminides particularly so at between 600 and 1000° C.

While the invention has been described with reference to details of the illustrated embodiment, these details are not intended to limit the scope of the invention as defined in the appended claims. For example, the process is applicable to metals which are only slightly soluble in lithium, such as nickel. While the yield is lower, the temperatures required to process the nickel also is much lower due to the higher exothermicity of the reactions related to less lithium soluble metals.

What is claimed is:

1. A method for producing metal powder, the method comprising:

a) supplying a molten bath containing a reducing agent;
    b) contacting a metal oxide with a molten bath having the surface of the molten bath in contact with an oxygen permeable membrane containing thoria or ceramic, or thoria-YSZ mixture, or combinations thereof;

c) applying a voltage potential across the membrane for a time and at a temperature sufficient to produce free oxygen;

d) removing the oxygen from the molten bath via electrochemical pumping;

e) isolating elemental metal from the molten bath; and, f) separating the elemental metal from the molten bath via gravity.

2. The method as recited in claim 1 wherein the reducing agent is a metal selected from the group consisting of lithium, calcium, magnesium, strontium, and combinations thereof.

3. The method as recited in claim 1, wherein the molten bath is maintained in an inert atmosphere.

4. The method as recited in claim 1 wherein the oxide contains a metal having a higher electron affinity than the reducing agent, the metal and metal oxide selected from the group consisting of zirconium, uranium, plutonium, zirconium oxide, uranium oxide, plutonium oxide, titanium oxide, hafnium oxide, molybdenum oxide, vanadium oxide, chromium oxide, iron oxide, cobalt oxide, nickel oxide, and combinations thereof.

5. A method for producing zirconium powder, the method comprising:

a) supplying molten lithium containing zirconium oxide in an inert atmosphere;

b) contacting zirconium oxide with the molten lithium for a time and at a temperature sufficient to reduce the zirconium to elemental metal and produce oxygen;

c) supplying a voltage potential across an oxygen permeable membrane in contact with the molten lithium to draw the oxygen from the molten lithium;

d) removing the elemental metal from the molten fluid; and e) removing free oxygen from the inert atmosphere.

6. The method as recited in claim 5 wherein oxygen is removed from the atmosphere via electrochemical pumping.

7. The method as recited in claim 5 wherein the temperature of the method is maintained at between 350° C. and 650° C. during the reduction of the zirconium oxide.

8. The method as recited in claim 5 wherein the step of removing the elemental metal from the molten bath further comprises:

a) allowing the molten bath to cool;

b) dissolving the cooled bath; and c) removing the elemental metal as a solid from the dissolved bath.

* * * * *